(12) United States Patent
Himeno et al.

(10) Patent No.: US 7,769,085 B2
(45) Date of Patent: Aug. 3, 2010

(54) IMAGE DATA PROCESSING DEVICE AND METHOD

(75) Inventors: Takuji Himeno, Chiba (JP); Yasuhiro Hashimoto, Tokyo (JP); Hiroyasu Tsuchida, Tokyo (JP); Fumiyoshi Abe, Kanagawa (JP); Tomoyuki Miyakoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 1534 days.

(21) Appl. No.: 10/520,445

(22) PCT Filed: Jul. 2, 2003

(86) PCT No.: PCT/JP03/08432

§ 371 (c)(1),
(2), (4) Date: Jan. 6, 2005

(87) PCT Pub. No.: WO2004/006576

PCT Pub. Date: Jan. 15, 2004

(65) Prior Publication Data

US 2005/0254574 A1 Nov. 17, 2005

(30) Foreign Application Priority Data

Jul. 8, 2002 (JP) .............................. 2002-199072

(51) Int. Cl.
    *H04N 7/32* (2006.01)
(52) U.S. Cl. .................................. 375/240.12; 386/111
(58) Field of Classification Search ................. 386/109, 386/111, 112, 46; 375/240.26, 240.12
See application file for complete search history.

(56) References Cited

U.S. PATENT DOCUMENTS

| | | | |
|---|---|---|---|
| 5,461,420 A | 10/1995 | Yonemitsu et al. | |
| 5,619,341 A * | 4/1997 | Auyeung et al. | 358/404 |
| 5,677,969 A | 10/1997 | Auyeung et al. | |
| 5,835,149 A * | 11/1998 | Astle | 375/240.05 |
| 5,859,660 A | 1/1999 | Perkins et al. | |
| 5,949,487 A | 9/1999 | Blanchard | |
| 6,289,129 B1 | 9/2001 | Chen et al. | |
| 6,301,428 B1 | 10/2001 | Linzer | |
| 6,724,977 B1 * | 4/2004 | Linzer | 386/52 |
| 2006/0153538 A1 * | 7/2006 | Himeno et al. | 386/111 |

FOREIGN PATENT DOCUMENTS

| | | |
|---|---|---|
| EP | 1 193 983 A2 | 4/2002 |
| JP | 10-308942 | 11/1998 |
| JP | 2000-92448 | 3/2000 |
| JP | 2001-275077 | 10/2001 |

OTHER PUBLICATIONS

Communication the EPO, dated Jun. 29, 2009.

* cited by examiner

*Primary Examiner*—David E Harvey
(74) *Attorney, Agent, or Firm*—Frommer Lawrence & Haug LLP; William S. Frommer; Ellen Marcie Emas

(57) ABSTRACT

The present invention provides an image data processing method of recording image data coded with the MPEG (Moving Picture Experts Group) technique to a recording medium. For transition of the bit occupancy in a VBV buffer to a target value, the initial value of a bit occupancy in a VBV buffer is calculated on the basis of auxiliary data read from a recording medium, a comparison is made between the target and initial values of the bit occupancy, and the number of bits for assignment to each GOP of to-be-coded image data correspondingly to the result of comparison.

24 Claims, 15 Drawing Sheets

IMAGE DATA PROCESSING DEVICE AND METHOD

TECHNICAL FIELD

The present invention relates to an image data processing apparatus for, and an image data processing method of, recording image data encoded with the MPEG (Moving Picture Expert Group) technique to a recording medium.

This application claims the priority of the Japanese Patent Application No. 2002-199072 filed on Jul. 8, 2002, the entirety of which is incorporated by reference herein.

BACKGROUND ART

To compress a moving picture efficiently by coding, there have been proposed digital moving picture coding techniques represented by MPEG-2 (ISO/IEC 13818). In this image compression with the MPEG-2 technique, a hybrid conversion including a combination of inter-image motion compensation and DCT (discrete cosine transform) is effected to make further quantization and variable-length coding of a signal resulted from the conversion.

The MPEG-2 technique adopts the bidirectional predictive coding technique to encode a moving picture. This bidirectional predictive coding technique includes three types of coding: intra-frame coding, inter-frame forward predictive coding, and bidirectional predictive coding. Moving pictures encoded by these types of bidirectional predictive coding techniques are called I (intra-coded), P (predicted) and B (bidirectionally coded) pictures, respectively. Also, I, P and B pictures are appropriately combined to form a GOP (group of pictures) structure as a random access code. It should be noted here that generally, I pictures are produced in a largest number, P pictures are in a next largest number and the B pictures are in a smallest number.

To produce an image by encoding a coded bit stream recorded in a recording medium accurately in a decoder at the time of reproduction with a coding method in which I, P and B pictures are produced in different numbers, respectively, such as the MPEG-2 technique, it is necessary to always know the data occupancy in an input buffer in the decoder by means of an encoder.

FIG. 1 shows a transition in data occupancy of an MPEG stream supplied to an input buffer of a decoder. In FIG. 1, a time (t) is indicated on the horizontal axis along which times (t101, t102, t103, . . . ) at which pictures included in the supplied MPEG stream to be decoded are shown, and data occupancy in the input buffer is indicated on the vertical axis.

The input buffer sequentially stores the MPEG streams compressed with the MPEG-2 technique at their respective bit rates. At the time t101 at which a VBV (video buffering verifier) delay (vbv_delay) has elapsed after a time t100 at which the MPEG streams have started being supplied, a first picture will be extracted from the decoder for decoding. The data amount of the picture extracted from the decoder is a sum of picture_size, picture_start_code, sequence_header and GOP_header of that picture. The data amount will be referred to as "image size" hereunder.

Note that also after the time t101, the input buffer will continuously be supplied with MPEG streams in sequence at a predetermined bit rate. Also, at the times t102, t103, . . . elapsing at every ΔDTS (decode time stamp) after the time t101, data in each picture will be extracted by the decoder in an amount corresponding to the image size of that picture. In such an input buffer, an overflow will arise when a difference in total data amount between the supplied MPEG streams and image size of the picture extracted at each ΔDTS is larger than the size of the input buffer, and an underflow will arise when the difference is smaller than that size.

On this account, in the MPEG technique, it is assumed that the encoder has a VBV (video buffering verifier) buffer provided as a virtual buffer corresponding to the input buffer in the decoder in order to control the amount of generated code data. At the encoder, the amount of generated code data is controlled for each picture type not to cause any failure of the VBV buffer, that is, not to cause data underflow or overflow of the VBV buffer.

Note here that new image data is recorded starting at a recording end point on the recording medium such as a magnetic tape on which image data has already been recorded, namely, so-called image splicing is effected, in some cases. Also note that since the DV (digital video) VTR (video tape recorder) in which only intra-frame data is compressed records one frame over 10 tracks, so the splicing can easily be done by making switching from reproduction to recording while the tape is running, and recording image data resulted from compression of a frame to be recorded starting at a next track.

However, with the MPEG-2 technique in which the intra-frame compression is used, it is not possible to record image data on a fixed number of recording tracks because the size of one frame varies. Therefore, the MPEG-2 technique is not capable of easy splicing.

As mentioned above, with the MPEG technique, it is necessary to control the amount of generated code data for each picture so that there will not occur any data underflow or overflow of the input buffer at the time of decoding, and splice new compressed image data to be recorded correspondingly to the size of the VBV buffer. More particularly, to decode image data without any failure of the input buffer even if image data before and after an edition point where splicing is to be done are successively reproduced, it is necessary to acquire VBV_delay and DTS by reading auxiliary data of the existent image data from the recording medium, convert the image data into a data occupancy in the VBV buffer, and set the data occupancy as an initial value for the encoder.

Generally, when the data occupancy is low for the size of the VBV buffer, the picture size will be limited for a picture whose amount of generated code data is large not to underflow the VBV buffer, and thus no sufficient amount of code can be assigned to a complicated image or I picture, which will result in a lower image quality. On the other hand, if the data occupancy is high for the size of the VBV buffer, a stuffing will easily arise to prevent overflowing of the VBV buffer, the effective amount of generated code data is reduced correspondingly, which will also result in a lower image quality. On this account, the initial value of the data occupancy in the VBV buffer has to be set to an optimum value with consideration given to the normal image quality.

The initial value of the data occupancy in the VBV buffer, set based on a VBV delay (VBV_delay) acquired by reading auxiliary data in existent image data from a recording medium will no always be any optimum value and underflow or overflow will take place, which will continuously cause a lower image quality in many cases.

DISCLOSURE OF THE INVENTION

Accordingly, the present invention has an object to overcome the above-mentioned drawbacks of the aforementioned conventional image data processing apparatus and method by providing an improved and novel image data processing apparatus and method.

The present invention has another object to provide an image data processing apparatus, capable of optimally controlling the data occupancy in a VBV buffer with little degradation of the image quality whatever the initial value of the data occupancy is.

To attain the above objects, the Inventors of the present invention propose an image data processing apparatus and an image data processing method, in which the initial value of a bit occupancy in a VBV buffer is calculated on the basis of auxiliary data read from a recording medium for transition of the bit occupancy to a target value, the target and initial values of the bit occupancy in the VBV buffer are compared with each other and the number of bits for assignment to each GOP of image data to be coded is controlled correspondingly to the result of comparison.

More particularly, the above object can be attained by providing an image data processor for controlling the number of bits for assignment to each GOP (group of pictures) of to-be-coded image data for transition of the bit occupancy in a VBV buffer, used in decoding with the MPEG technique, to a target value, the apparatus including according to the present invention:

a calculating means for calculating the initial value of a bit occupancy in the VBV buffer on the basis of auxiliary data read from a recording medium;

a comparing means for making a comparison between the target and initial values of the bit occupancy; and a controlling means for controlling the number of bits for assignment to each GOP correspondingly to the result of comparison.

Also, the above object can be attained by providing an image data processing method of controlling the number of bits for assignment to each GOP (group of pictures) of to-be-coded image data for transition of the bit occupancy in a VBV buffer, used in decoding with the MPEG technique, to a target value, the method including, according to the present invention, the steps of:

calculating the initial value of a bit occupancy in the VBV buffer on the basis of auxiliary data read from a recording medium;

making a comparison between the target and initial values of the bit occupancy; and controlling the number of bits for assignment to each GOP correspondingly to the result of comparison.

These objects and other objects, features and advantages of the present invention will become more apparent from the following detailed description of the best mode for carrying out the present invention when taken in conjunction with the accompanying drawings.

BEST MODE FOR CARRYING OUT THE INVENTION

The present invention will be described in detail below concerning the embodiments of the image data processing apparatus and method with reference to the accompanying drawings.

Figure 1:
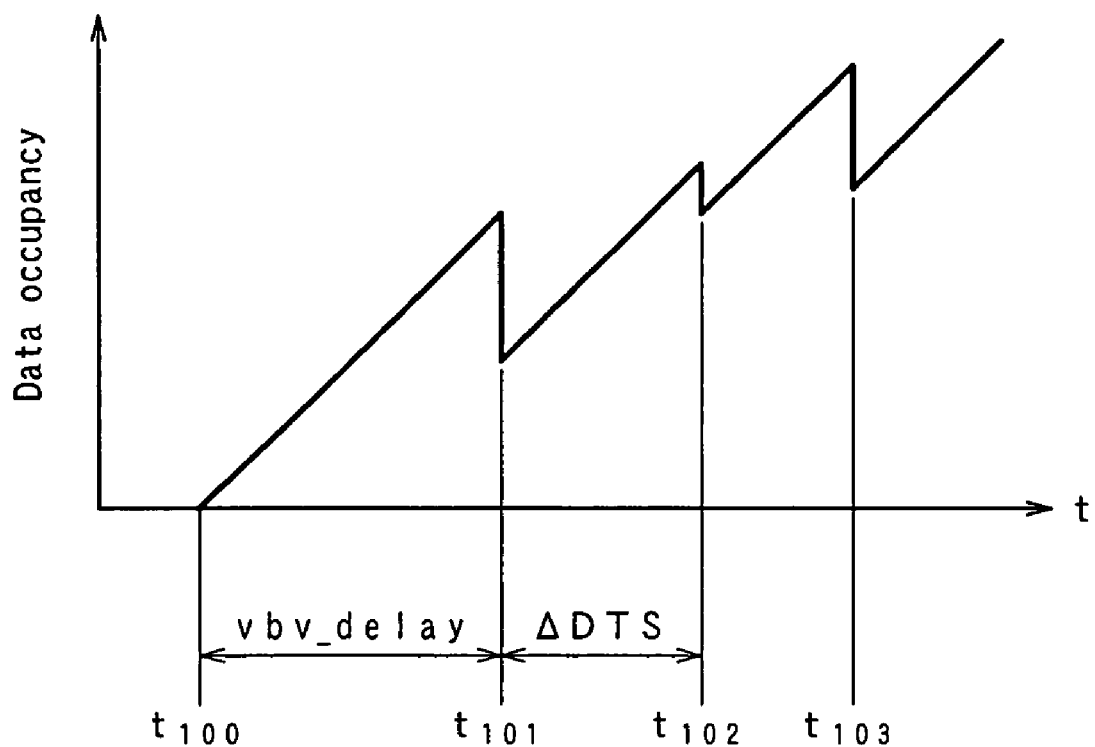
FIG. 1 shows a transition in data occupancy of an MPEG stream supplied to an input buffer of a decoder.
Figure 2:
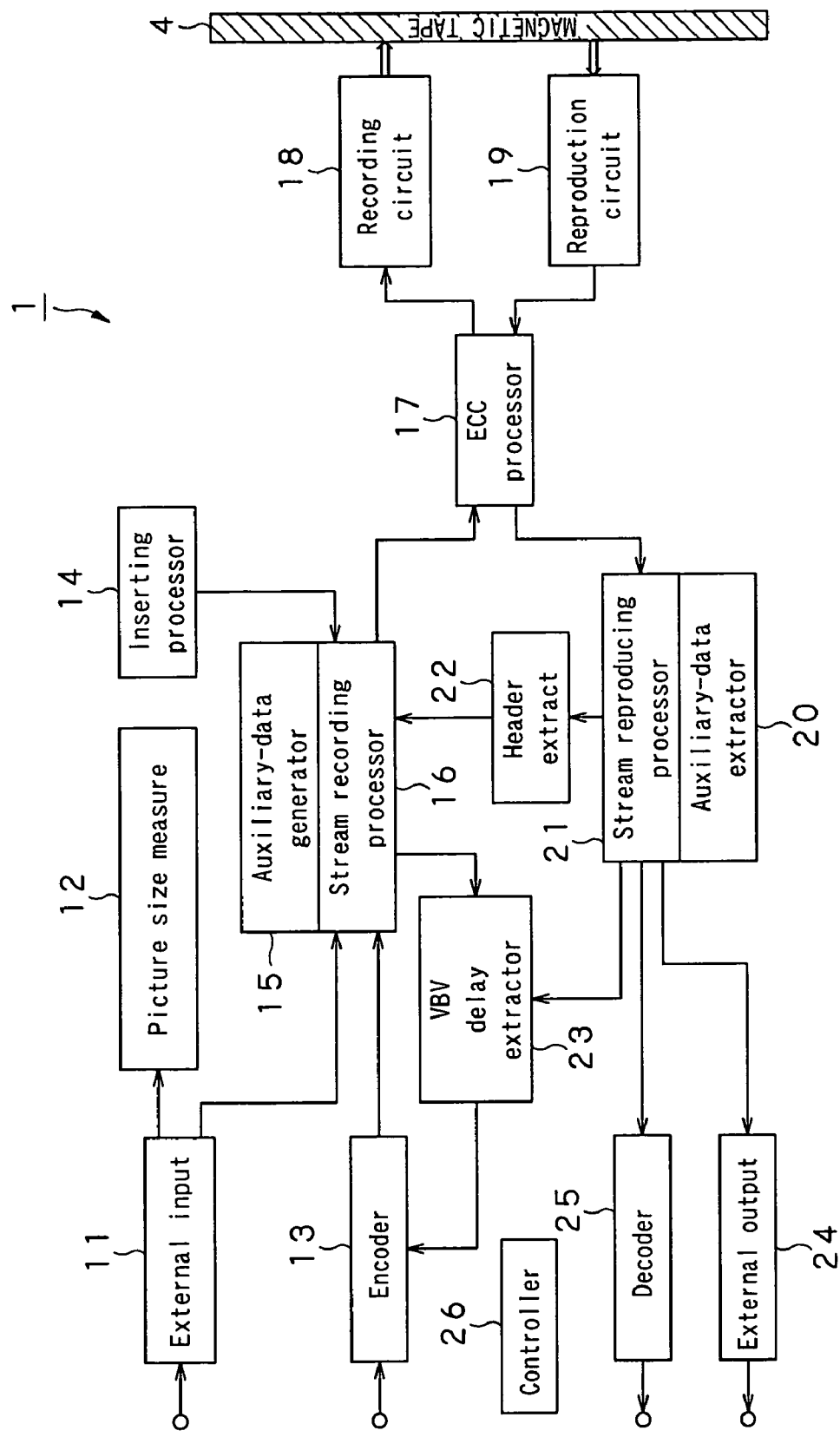
FIG. 2 is a block diagram of the image data processor according to the present invention.

Referring now to FIG. 2, there is schematically illustrated in the form of a block diagram an image data processor for encoding a moving picture into a digital moving picture for recording to a magnetic tape with the MPEG-2 (ISO/IEC 13818) technique with which a moving picture is compressed efficiently by coding. As shown, the image data processor, generally indicated with a reference 1, includes an external input unit 11, picture size measurement unit 12, encoder 13, inserting processor 14, auxiliary-data generator 15, stream recording processor 16, ECC (error correction code) processor 17, recording circuit 18, reproduction circuit 19, auxiliary-data extraction unit 20, stream reproducing processor 21, header extraction unit 22, VBV (video buffering verifier) display extraction unit 23, external output unit 24, decoder 25 and a controller 26.

The above external input unit 11 is supplied with image data sent as TSs (transport stream) from any other external device, divides it into PESs (packetized elementary stream) and sends them to the stream recording processor 16. It should be noted here that the size of each picture included in image data supplied to the external input unit 11 is measured by the picture size measurement unit 12.

The above encoder 13 encodes image data supplied based on a VBV (video buffering verifier) delay sent from the VBV delay extraction unit 23 on the basis of encoding parameters including a picture type, quantization step, etc. The encoder 13 sends the encoded image data to the stream recording processor 16.

The above inserting processor 14 generates a copy picture repeatedly representing a previous picture and a stuffing byte as dummy data when the amount of generated code data for encoding image data is small. It should be noted that the stuffing byte is data having no special meaning and it will be discarded at the decoder. The inserting processor 14 outputs the copy picture and stuffing byte thus generated to the stream recording processor 16.

The above auxiliary-data generator 15 outputs auxiliary data (AUX) added to each data group led by an I or P picture and including a B picture to the stream recording processor 16.

The stream recording processor 16 is supplied with image data from the external input unit 11 or encoder 13. Also, the stream recording processor 16 is supplied with a copy picture and stuffing byte from the inserting processor 14, and also with auxiliary data from the auxiliary-data generator 15 and various headers from the header extraction unit 22. The stream recording processor 16 inserts the auxiliary data, copy picture etc. between data groups beginning with an I or P picture, included in the image data, to generate one data stream. At this time, the stream recording processor 16 extracts a VBV delay by the VBV delay extraction unit 23 from the generated data stream as the case may be. The stream recording processor 16 sends the generated data stream to the ECC processor 17.

The ECC processor 17 adds an ECC (error correction code) to the input data stream and makes interleaving of the input data. The ECC processor 17 includes a unique ECC Bank memory (not shown) to temporarily store a data stream which is to actually be recorded to a magnetic tape 4.

The recording circuit 18 records the data stream supplied from the ECC processor 17 to the magnetic tape 4. The recording circuit 18 converts the input data into serial data, amplifies the serial data and records it by a magnetic head (not shown) to the magnetic tape 4 rotated by a rotating drum (not shown), for example.

The reproduction circuit 19 reproduces image data recorded on the magnetic tape 4, reads auxiliary data recorded in an auxiliary recording area on the magnetic tape 4, and sends the image data and auxiliary data to the ECC processor 17.

The stream reproducing processor 21 is supplied with the image data reproduced from the magnetic tape 4 and auxiliary data from the reproduction circuit 19 and ECC processor 17. The stream reproducing processor 21 outputs the input image data to the external output unit 24 or decoder 25. From the auxiliary data supplied to the stream reproducing processor 21, PTS (presentation time stamp) and DTS (decoding time stamp) are extracted by the header extraction circuit 22 and a VBV delay is extracted by the VBV delay extraction unit 23. Other auxiliary data are extracted by the auxiliary-data extraction unit 20.

The external output unit 24 decodes image data supplied as PESs from the stream reproducing processor 21 to provide TSs (transport stream), and sends them to the other electronic device. The decoder 25 decodes the image data supplied as PESs from the stream reproducing processor 21 on the basis of encoding parameters including a picture type, quantization step, etc.

Note that circuits and elements included in the image data processor 1 according to the present invention operate under the control of the controller 26.

Recording to the magnetic tape 4 in the image data processor 1 according to the present invention is done as will be described below. It should be noted that the recording which will be described herein is based on the technique disclosed in the Japanese Patent Application Laid Open No. 2001-275077.

Figure 3:
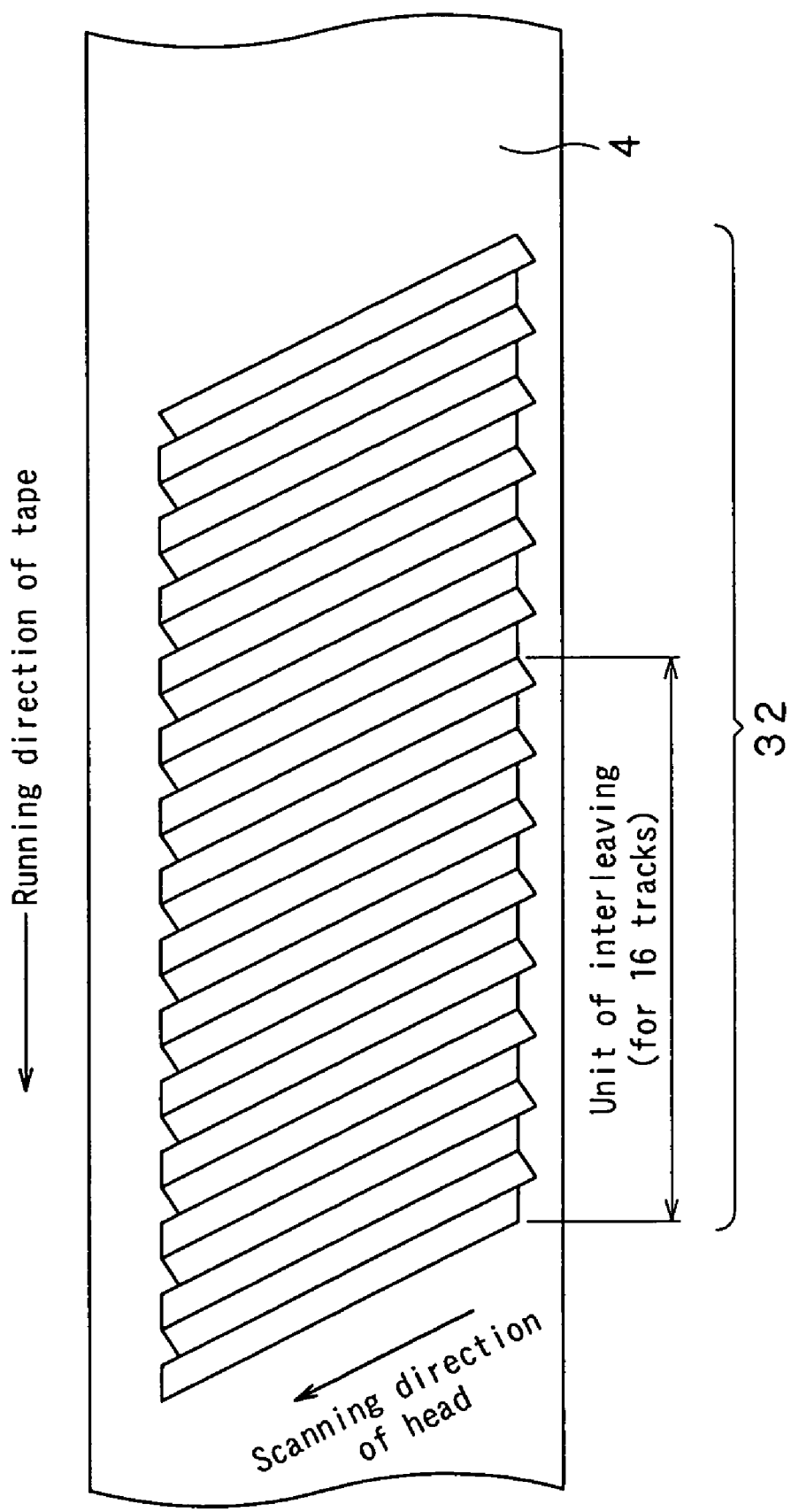
FIG. 3 is a plan view of a magnetic tape having a recording track formed thereon.

As shown in FIG. 3, the magnetic tape 4 has formed thereon helical tracks 32 to which information such as video signals or the like is recorded by a magnetic head.

The helical tracks 32 are formed oblique in relation to the length of the magnetic tape 4.

Figure 4:
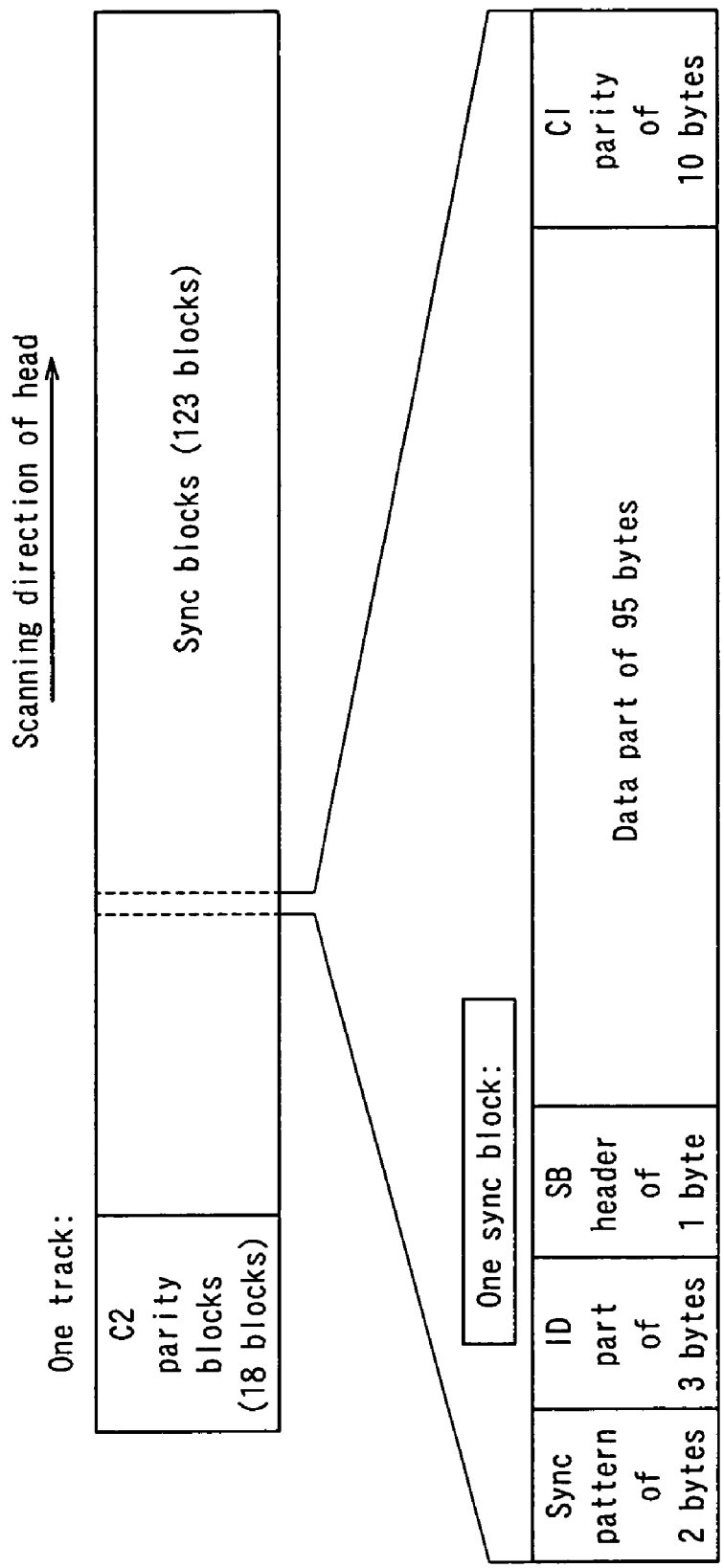
FIG. 4 shows the construction of a helical track formed on the magnetic tape.

Each of the helical tracks 32 includes 123 sync blocks and 18 C2 parity sync blocks as shown in FIG. 4. Sixteen of the helical tracks 32 are taken as a unit of interleaving for C2ECC in the ECC processor 17. The ECC processor 17 assigns sync blocks in 16 helical tracks 32 to the ECC surface by interleaving to form a C2 parity, and records the C2 parity to the C2 parity sync block.

Each of the sync blocks includes a 2-byte sync pattern, 95-byte data part, 1-byte sync block header (SB header), 3-byte ID part including a track pair No., sync block No. etc., and a 10-byte C1 parity for these preceding data in this order. Namely, each sync block is of 111 bytes.

The ones of the helical tracks 32, adjacent in the order of negative and positive azimuth, are identical in value to each other. A number resulted from addition of one for only a positive-azimuth track to a double of a track pair No. will be taken as a track No. Also, the SB header has recorded therein the type of data recorded to the sync block (SB).

Figure 5:
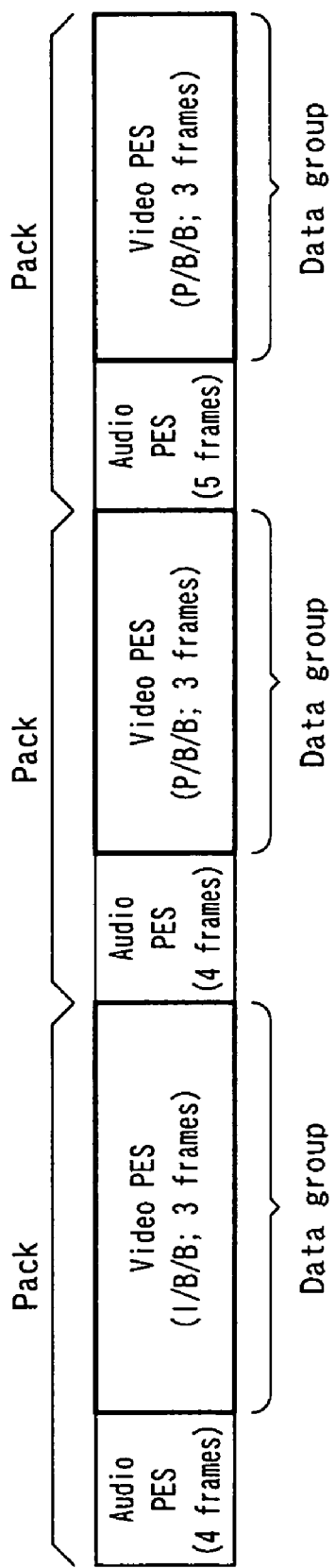
FIG. 5 shows a data group.

Note here that video and audio data formed as PES packets with the MPEG-2 technique are divided into sync blocks for recording. As shown in FIG. 5, the video data is a PES formed from a combination of three frames including an I picture and B pictures or including a P picture and B pictures. Audio data each corresponding to a PTS (presentation time stamp) and video data are recorded alternately in this order in a sync block. The unit of audio and video data in combination will be referred to as "Pack" hereunder. Video data formed from three frames including an I picture and B pictures or an P picture and B pictures in this order is called "data group".

Note here that an AUX-A sync block as auxiliary data for audio data and an AUX-V sync block as auxiliary data for video data are recorded in each Pack.

The image data processor 1 constructed as above according to the present invention functions as will be described below:

Since the amount of generated code data is different from one picture type to another, so the image data processor 1 using the MPEG-2 technique has to always monitor the data occupancy in the input buffer in the decoder 25 by the encoder 13 in order to produce an image by accurately encoding data stream recorded in the magnetic tape 4 at the decoder 25 at the time of data reproduction.

Figure 6:
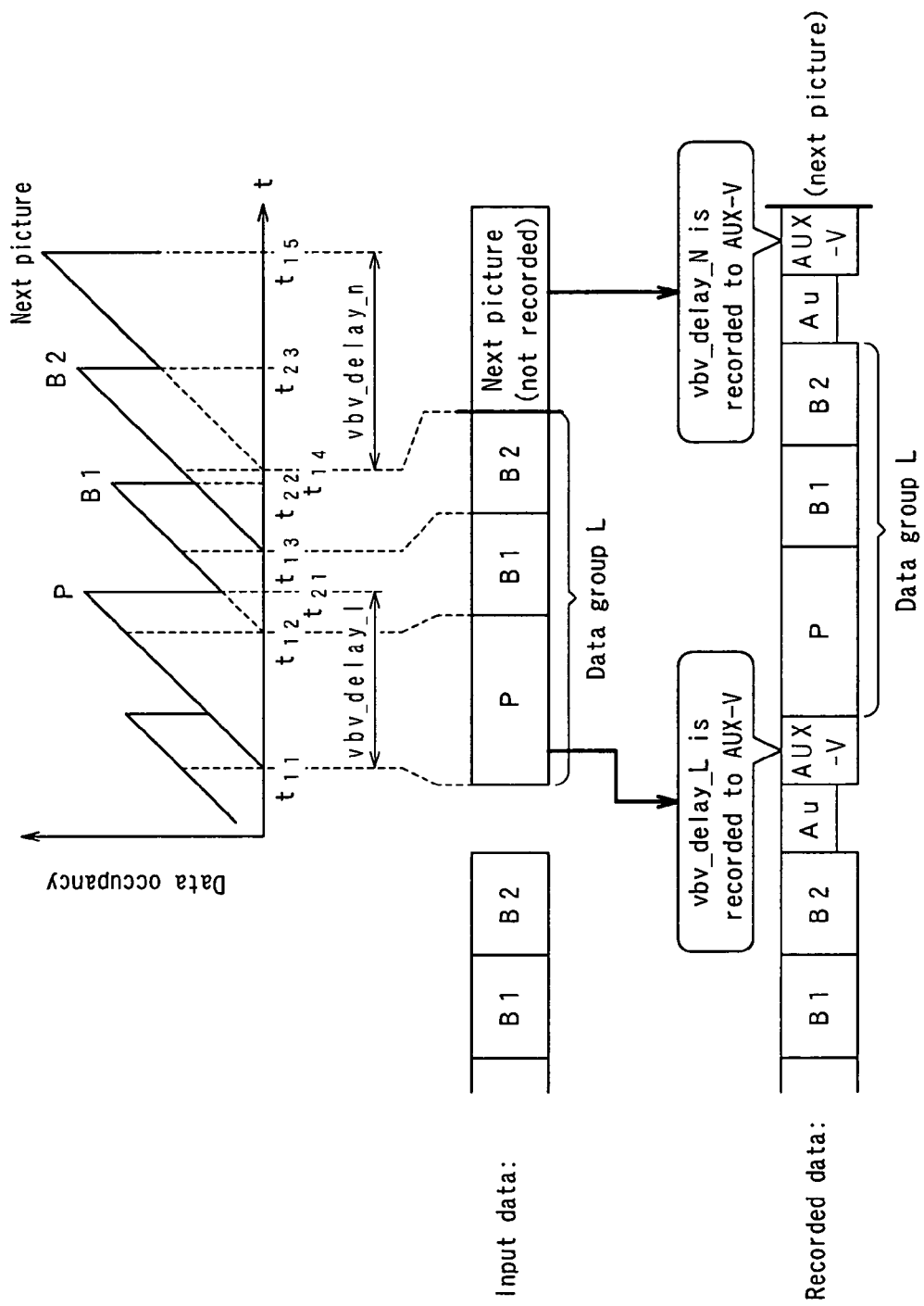
FIG. 6 shows a transition in data occupancy of a data group supplied to the image data processor.

FIG. 6 shows a transition in data occupancy, in the input buffer of the decoder 25, of a last data group L supplied to the image data processor 1. In FIG. 6, the horizontal axis indicates a time (t) at which pictures P, B1 and B2 included in the supplied data group L are decoded. Also, the vertical axis indicates the data occupancy in the input buffer.

The input buffer sequentially stores data streams compressed by encoding with the MPEG-2 technique correspondingly to their bit rates. P picture is stored for a period from a time t11 to t12, B1 picture is stored for a period from the time t12 to t13, and B2 picture is stored for a period from the time t13 to t14. The decoder 25 extracts a P picture at a time t21 for decoding. Similarly, the decoder 25 extracts a B1 picture at a time t22 and a B2 picture at a time t23 for decoding.

The data amount of each picture extracted by the decoder 25 is a sum of picture data size (picture_size), data size of a picture start code (picture_start_code), data size of a sequence header (sequence_header) and data size of GOP header (GOP_header). The data amount will be referred to as "image size" hereunder. A period from the time t11 to t21 for which pictures are extracted by the decoder 25 after there is supplied a last byte of a picture start code of a P picture positioned at the top of the data group L will be referred to as "VBV delay (vbv_delay_1) hereunder.

As shown in FIG. 6, the data group L is followed by a picture which is to be inserted next to the data group L (will be referred to as "next picture" hereunder). The VBV delay (vbv_delay_n) of this next picture is a period from the time t14 to t15. When finally supplied with the data group L, the image data processor 1 can acquire a VBV delay (vbv_delay_n) of the next picture by encoding a slightly larger amount of data than necessary.

The image data processor 1 records the VBV delays (vbv_delay_1 and vbv_delay_n) that can thus be acquired, as auxiliary data, to an AUX-V sync block provided in each of the data groups. In the bottom portion of FIG. 6, there is shown a position on the magnetic tape 4 where an AUX-V sync block provided for the data group L and next picture is recorded. The position where the AUX-V sync block for the data group L is recorded is provided before a P picture positioned at the top of the data group L. Similarly, the AUX-V sync block for the next picture is provided before the position where the next picture is recorded and after the position where the data group L is recorded.

The image data recorder 1 records the vbv_delay_1 having been acquired for the P picture in the data group L to the AUX-V sync block provided for the data group L. Similarly, it records vbv_delay_n having been acquired for the next picture to the AUX-V sync block provided form the next picture.

By reproducing the magnetic tape 4 having the above data stream recorded therein, it is possible to read vbv_delay_1 and vbv_delay_n recorded in the AUX-V sync blocks, respectively. Thus, the image data processor 1 can acquire existent image data even for recording new image data starting at the recording end position of the existent image data on the magnetic tape 4, namely, even for so-called splicing. It should be noted that image data having vbv_delay_1 or the like recorded therewith as above for image data which is to be spliced is called "priming image data".

More specifically, taking a next picture as image data to be spliced to predetermine vbv_delay_n the next picture should have, the image data processor 1 can record image data to the magnetic tape 4. Thus, since vbv_delay_n read from the magnetic tape 4 at the time of reproduction can be converted into a data occupancy in the VBV buffer and set as an initial value for the encoder, it is possible to control the amount of generated code data for each picture even with the MPEG-2 technique in which the size of one frame varies, and easily splice image data without any failure of the input buffer.

Note that in the image data processor 1 according to the present invention, it is also possible to record, to the AUX-V sync block, an end point flag for indicating that the data group L is a last supplied data group. Thus, when splicing image data, an area where image data is recorded based on the end point flag can easily be identified, and overwriting on existent image data can be prevented.

The image data processor 1 may be adapted to record the last supplied data group L and next picture as well as all other data groups to the AUX-V sync group provided for each of the data groups by identifying a VBV delay of a top picture in each data group. Since the AUX-V sync block of the next picture has also vbv_delay_n recorded therein, commonality in auxiliary-data type among all the AUX-V sync blocks provided on the recording medium can be achieved by recording the VBV delay to the AUX-V sync block for each picture.

Further, the image data processor 1 may use DTS or the like instead of a VBV delay as auxiliary data and record it to the AUX-V sync block. Of course, DTS or PTS may be used in place of a VBV delay.

If DTS or PST supplied from any other electronic device is recorded as it is to the AUX-V sync block, the recorded DTS or PTS will possibly jump at the time of reproduction. Normally, an offset value is added to DTS or PTS before recording to the AUX-V sync block. DTS acquired from AUX-V of the data group L is taken as "DTS0". Also, DTS acquired for a next picture to be spliced is taken as "DTS2". At this time, the offset value is calculated on the basis of a formula: DTS0−DTS2+(No. of copy pictures)×(display time of copy picture), and added to DTS or PTS before recording.

For aborting an encoded data stream or a data stream supplied from any other electronic device, the vbv_delay_n value of the next picture can be recognized. However, when the data stream supplied from the other electronic device has completely been recorded down to the last picture, no next picture exists. In such a case, it is not possible to recognize the vbv_delay_n value of the next picture, and record it as auxiliary data to the AUX-V sync block at the time of recording. On this account, for recording a picture supplied from the other electronic device to the magnetic tape 4, the vbv_delay_n value of a next picture is pre-calculated at the time of recording, and recorded to the AUX-V sync block of the next picture. Thus, the vbv_delay_n value of the next picture can easily be read out and splicing can easily be done without any failure of the input buffer.

Figure 7:
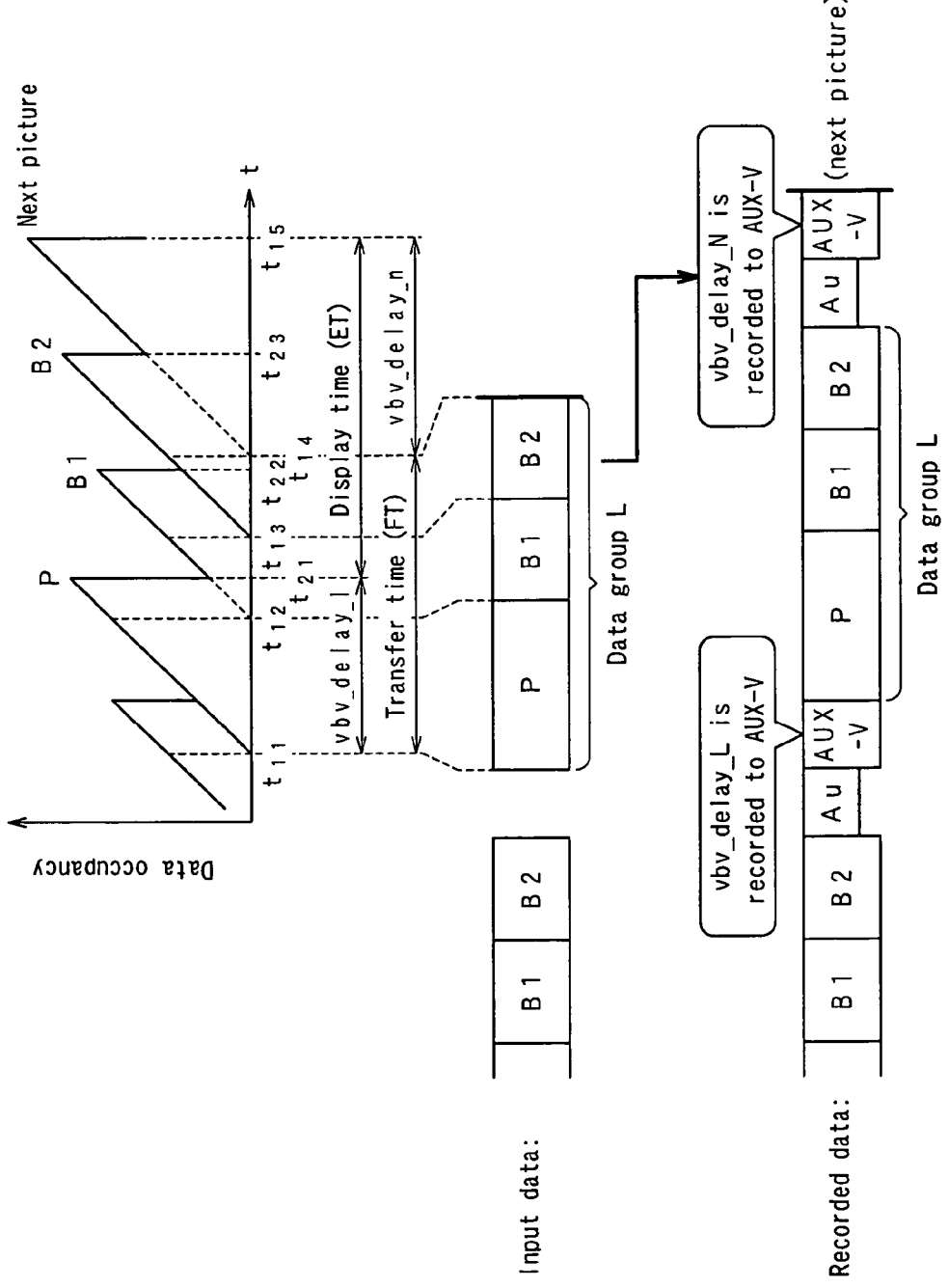
FIG. 7 explains an example of a pre-calculation effected for recording when a vbv_delay_n value of a next picture is unknown.

FIG. 7 explains an example of the pre-calculation effected for recording when the vbv_delay_n value of a next picture is unknown. The image data processor 1 is supplied with a data group L supplied finally and including a P picture, B1 picture and B2 picture. At this time, the image data processor 1 calculates the vbv_delay_n value of a picture to be supplied next to the last supplied data group L from vbv_delay_1 of the P picture at the top of the data group L, a time (FT) for transferring, and a time (ET) for displaying, the data group L by the following equation (1):

$$vbv\_delay\_n = vbv\_delay\_1 + ET - FT \quad (1)$$

For the above transfer time FT, three frames forming the data group L are extracted to calculate a sum of numbers of bits (d bits). Then, the sum d is divided by a bit rate to provide a time required for the transfer, and the time thus obtained is multiplied by 90,000 to provide a transfer time (FT) on the time base of 90 kHz which is the same as that for the VBV delay. Also, the display time (ET) for the three frames included in the data group L is three times 3003 when the frame rate is 29.97 Hz, and the difference between this display time (ET) and the above transfer time (FT) is a variation of the VBV delay. Thus, a vbv_delay_n value can be given by the following equation (2):

$$vbv\_delay\_n = vbv\_delay\_1 + 3000 \times 3 - 90000 \times d/bit\ rate \quad (2)$$

The image data processor 1 records the vbv_delay_n value thus determined to the AUX-V sync block of the next picture. The similar method can be used to predetermine DTS of a next picture in case a VBV delay is recorded to AUX-V as well as in case DTS is recorded to AUX-V.

As above, the image data processor 1 according to the present invention can determine a vbv_delay_n value of a next picture, even if it is unknown, based on the above equation (1) or (2). So, for obtaining an initial value for the encoder at the time of reproduction, it becomes unnecessary to read all existent image data just before the recording end position for calculation of a picture size. Thus, the image data processor 1 according to the present invention can make a calculation in a reduced time and thus a transition to recording operation (REC) in a reduced time.

Next, the operation of the ECC Bank memory in the ECC processor 17 will be explained.

Figure 8:
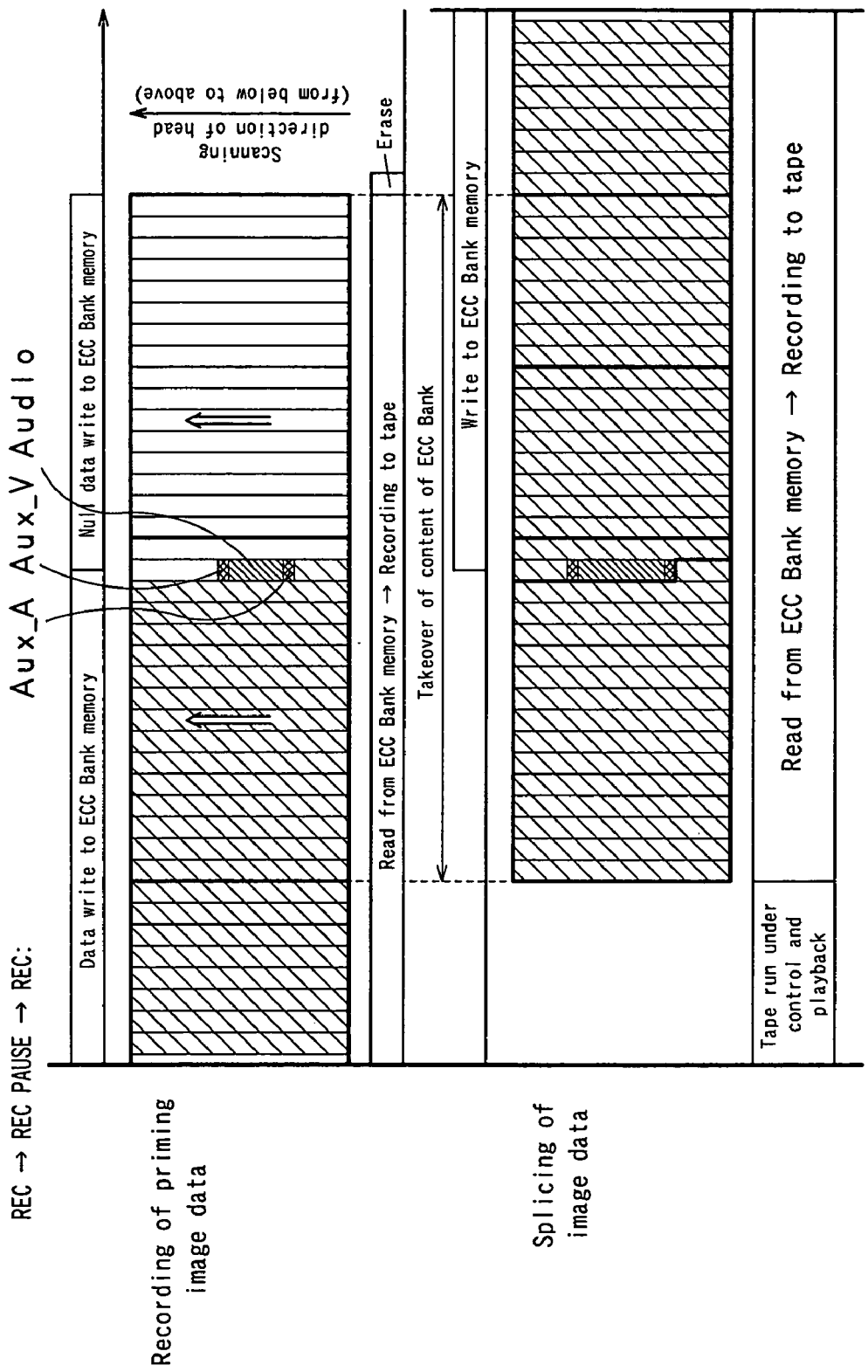
FIG. 8 explains operations of an ECC Bank memory in an ECC processor for splicing.

First, splicing by pausing a recording operation (REC) once (REC PAUSE) and making a recording operation (REC) again will be described. In case recording a data stream encoded by the encoder 13 or a data stream supplied via the external input unit 11 to the magnetic tape 4 is paused (REC PAUSE), a sync block when a data group L including last supplied three frame pictures is completely written to the ECC Bank is taken as a recording end point, and the AUX-A sync block of a Pack including a next picture to be spliced and sync block of audio data are written after the recording end point by making a recording operation (REC) again, as shown in FIG. 8. Finally, an AUX-V sync block to which auxiliary data such as vbv_delay_n of the next picture, END point flag, etc. are written.

The area extending from AUX-A to AUX-V as shown in FIG. 8 is an area when the auxiliary data starts being read and data stream to be spliced starts being written at the time of splicing. It should be noted that in case this area extends from the ECC Bank including the AUX-A sync block to a next ECC Bank, the sync block next to the AUX-V sync block of the next picture and subsequent sync blocks are filled with Null data in order to achieve commonality of the recording operations.

The ECC processor 17 records all supplied data stream to fill the ECC Bank necessary for generation of priming image data with a sync block or Null data, then. stops supply of a recording current used for recording to the magnetic tape 4 and operation of a mechanism which records a data stream to the magnetic tape 4, such as a rotating drum and the like (not shown). This is intended for supplying an excessive recording current because stopping of supply of a recording current just after recording data to a last helical track for recording to the magnetic tape 4 will possibly cause an error in the last helical track.

For splicing starting at a recording end point of priming image data on the magnetic tape 4, the magnetic tape 4 is first reproduced, the data stream of the existent priming image data is written once to the ECC Bank in the ECC processor 17 and an end point is searched in each of the AUX-V sync blocks. Only the ECC Bank including an AUX-V sync block having such an end point added thereto and a next ECC Bank are stored in the ECC Bank memory, and further writing to the ECC Bank memory is suspended for recording a next picture. At this time, the VBV delay, DTS or the like may be extracted from the AUX-V sync block having the end point flag added thereto.

Next, there will be explained how to designate a re-recording position at which a next picture to be spliced starts being recorded while viewing an image reproduced from the magnetic tape 4. In the ECC Bank, data streams of an image displayed on the screen when the reproduction is paused have overwritten thereon data streams of an image supplied later in many cases.

According to the present invention, each data group including three frames is recorded to the magnetic tape 4. In case there exists an I or P picture in a position where a next picture designed by the user while viewing a reproduced image is to be re-recorded, the next picture is to be re-recorded just before the I or P picture. On the other hand, in case there exists a B picture in a position where a designed next picture is to be re-recorded, the next picture is to be recorded just before the I or P picture at the top of a data group including the B picture.

The ECC processor 17 determines a position where the next picture is to be re-recorded correspondingly to a picture type existent in a designated recording position, rewinds the magnetic tape 4 to the determined recording position, and sequentially writes the re-recording positions thus determined to the ECC Bank memory. At this time, the determined re-recording position or any I or P picture of a data group immediately following this re-recording position is searched on the basis of DTS or the like, only an ECC Bank including AUX-A at the top of the Pack and a subsequent ECC Bank are stored into the ECC Bank memory, and writing subsequent ECC Bank to the ECC Bank memory is suspended for recording a next picture. Also at this time, a VBV delay, DTS or the like may be extracted from the AUX-V sync block in which an end point flag exists.

For splicing without viewing any image reproduced from the magnetic tape 4 and with selection of any re-recording position, the magnetic tape 4 is reproduced to write data streams one after another into the ECC Bank memory. At this time, each of the data groups is searched for a re-recording position in an order in which they are to be reproduced. Only an ECC Bank including AUX-A at the top of I or P picture of a data group just after an arbitrary re-recording position and a subsequent ECC Bank are stored in the ECC Bank memory, and then, writing further ECC Banks to the ECC Bank memory is suspended for recording a next picture. Also at this time, a VBV delay, DTS or the like may be extracted from the AUX-V sync block in which an end point flag exists.

Note that in case two ECC Banks are stored in the ECC Bank memory as above, a new input data stream is returned from the ECC Bank as will be described below. That is, the data stream in the sync block just before the re-recording position is left as it is in the ECC Bank memory. A new input data stream is written over a sync block after the re-recording position and synthesized in the ECC Bank memory. At this time, for each of the data streams in the ECC Bank memory in which the new data stream is overwritten and synthesized, a C2 parity is re-generated.

Then, the magnetic tape 4 is reproduced while viewing the track No. of a data stream going to be reproduced, and splicing is made starting at a track whose number coincides with the track No. added to the ECC Bank. That is, when data streams before and after a data stream to be returned are laid in succession on the magnetic tape 4, it is possible to smoothly reproduce the data streams without making any special operation at the re-recording position where the splicing is started.

Next, there will be explained how to take over vbv_delay_n of a next picture recorded in AUX-V and set it as an initial value for the encoder at the time of reproducing the magnetic tape 4 having the priming image data formed thereon as above.

At the time of reproducing, the image data processor 1 acquires vbv_delay_n of a next picture recorded in AUX-V, converts it into a data occupancy (vbv_occupancy) in the VBV buffer of the encoder 13, and sets a value thus obtained as an initial value of the encoder 13. The VBV buffer is provided as a virtual buffer corresponding to the input buffer in the decoder 25 in order to control the amount of generated code data for each picture. The vbv_occupancy in the VBV buffer can be calculated by the following equation (3) on the basis of the taken-over vbv_delay_n:

$$vbv\_occupancy = vbv\_delay\_n \times \text{bit rate}/90000 \quad (3)$$

Note here that the vbv_occupancy given by the above equation (3) does not always take an optimum value but will possibly cause an underflow or overflow, whereby the image quality is continuously degraded. Thus, whatever value the vbv_occupancy given by the equation (3) takes, it is necessary to optimally control the vbv_occupancy correspondingly to the capacity of the VBV buffer for prevention of any degradation in image quality.

By gradually correcting the vbv_occupancy beginning with the vbv_occupancy initial value (will be referred to as "vbv_occupancy_f" hereunder) calculated by the equation (3)), the image data processor 1 provides a transition of the vbv_occupancy_f to an optimum target value of vbv_occupancy (will be referred to as "vbv_occupancy_t" hereunder). More specifically, the image data processor 1 determines a difference between vbv_occupancy_f and vbv_occupancy_t, to thereby determine a necessary corrected amount of generated code data for convergence to vbv_occupancy_t. Then, the corrected amount of generated code data is divided by a necessary number of GOPs (will be referred to as "number_GOP" hereunder) for transition to vbv_occupancy_t to determine a corrected amount of generated code data per GOP. That is, the corrected amount of generated code data can be calculated by the following equation (4):

Corrected amount of generated code data=(vbv_occupancy_t−vbv_occupancy_f)/number_GOP  (4)

As above, the image data processor 1 spends a plurality of GOPs for transition from vbv_occupancy_f to vbv_occupancy_t. That is, since the amount of generated code data can gradually be corrected by multiplying the target vbv_occupancy by a plurality of GOPs (number_GOP) for transition to the target value vbv_occupancy_t, it is possible to reduce the amount of correction per GOP and thus prevent temporary image quality degradation.

Figure 9:
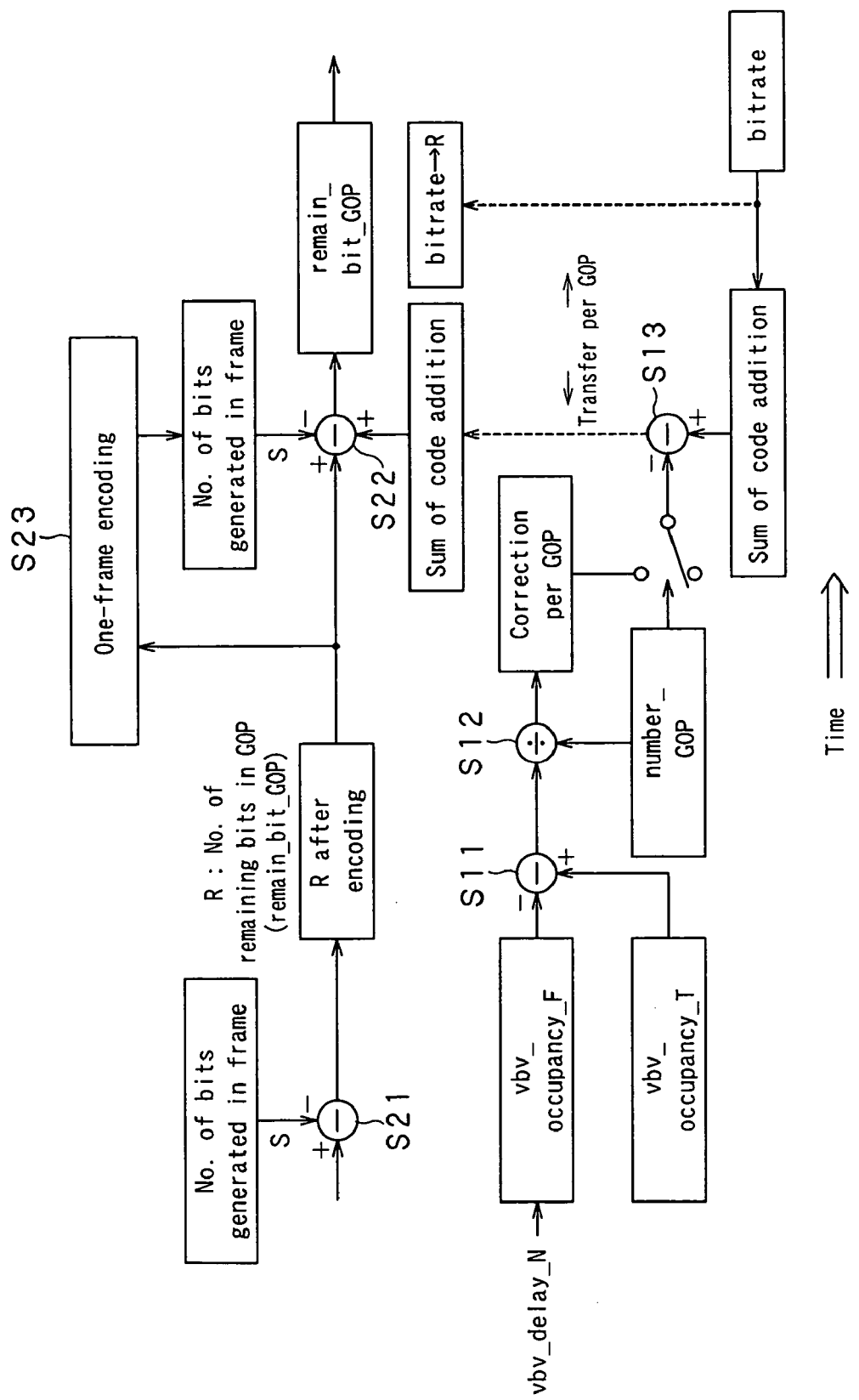
FIG. 9 shows a flow of operations made in controlling the amount of generated code data in an encoder.
Figure 10:
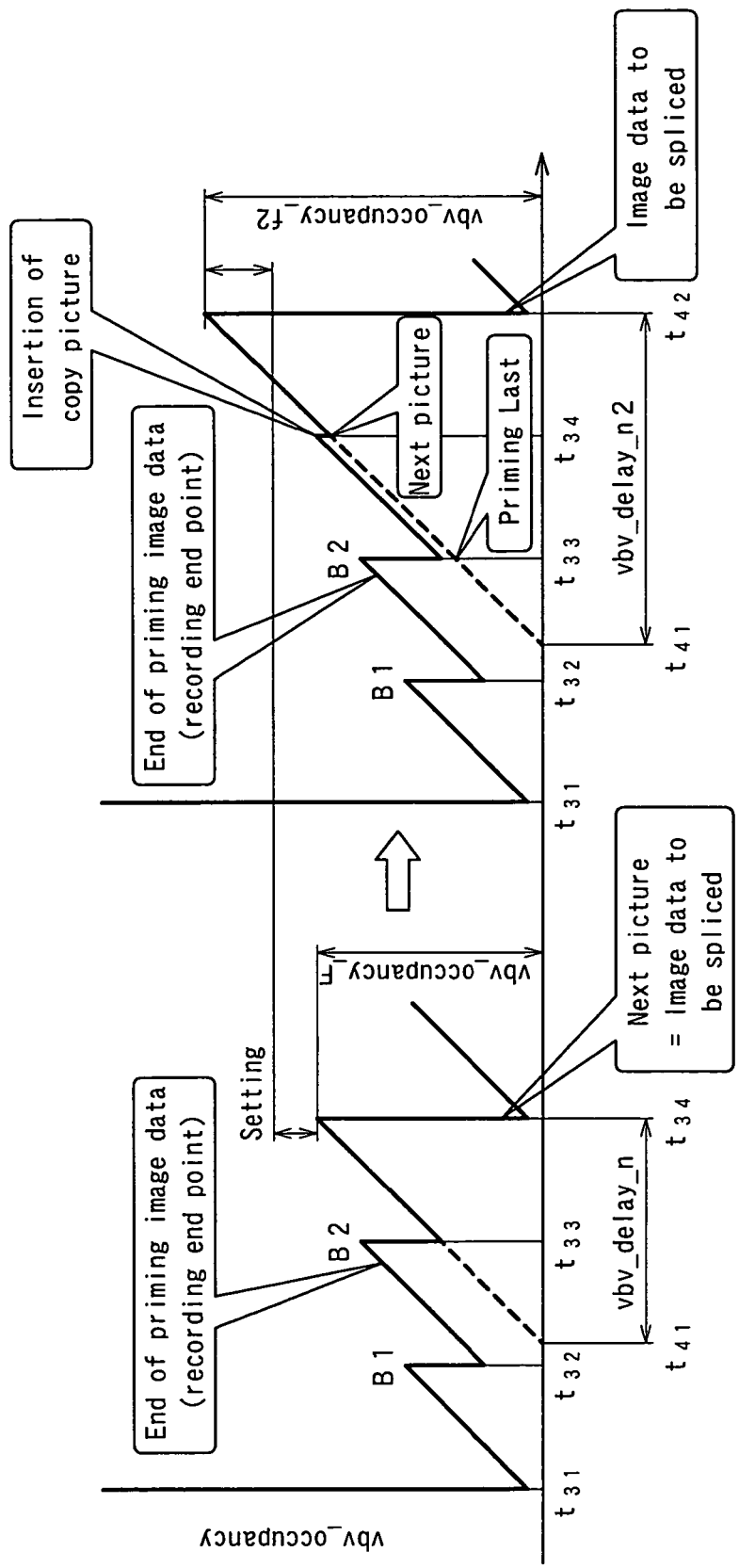
FIGS. 10A and 10B explain an example of continuous insertion of copy pictures when a vbv_occupancy_f value calculated on the basis of the vbv_delay_n value is smaller than a set one.

FIG. 9 shows a flow of operations made in controlling the amount of generated code data in the encoder 13. In FIG. 10, the direction of arrow indicates the time base.

First in step S11, a difference between vbv_occupancy_f given by the equation (3) on the basis of vbv_delay_n, and vbv_occupancy_t is determined. Next in step S12, the difference is divided by number_GOP to determine a corrected amount of generated code data per GOP. Then in step S13, a sum of code addition in each GOP controlled according to a bit rate is corrected by subtracting the corrected amount of generated code data from the sum of code addition.

On the other hand, image data except for one at the top of GOP has the amount of generated code data subtracted from remain_bit_GOP at each frame in step S21. In step S22, at the top of GOP, the sum of code addition corrected per GOP in step S13 is added to the code amount of each image data passing through step S21. Then in step S23, the intra-frame amount of generated code data based on encoding of data in units of a frame is subtracted from the code amount of each image data. Thus, the encoder 13 can get remain_bit_GOP whose code amount has been controlled as above. Since the remain_bit_GOP has the code amount thereof controlled per GOP, so the image quality will not be degraded continuously.

The number_GOP may be set to any value, fixed at a given value or set freely at each time correspondingly to the result of vbv_occupancy_t−vbv_occupancy_f. On the assumption that number_GOP is fixed at a given value, it can be assigned uniformly to each GOP irrespectively of the result of vbv_occupancy_t−vbv_occupancy_f. Also, by setting number_GOP freely at each time correspondingly to the result of vbv_occupancy_t−vbv_occupancy_f, it is possible to first determine an amount of correction per GOP and then set a necessary number_GOP.

The image data processor 1 assigns the above-mentioned remain_bit_GOP to each picture. At this time, the assigned amount of code may be varied correspondingly to the complexity of each picture type.

On the assumption that a coefficient representative of the complexity of I picture is Xi, coefficient representative of the complexity of P picture is Xp, coefficient representative of the complexity of B picture is Xb, for example, the number of yet-to-be-encoded P pictures in GOP is Np and the number of yet-to-be-encoded B pictures in GOP is Nb, a coefficient Y_i assigned to the I picture, coefficient Y_p assigned to the P picture and a coefficient Y_b assigned to the B picture can be expressed by the following equations (5), (6) and (7), respectively:

$Y\_i = 1 + Np \cdot Xp/Xi \cdot 1/Kp + Nb \cdot Xb/Xi \cdot 1/Kb$  (5)

$Y\_p = Np + Nb \cdot Xb/Xp \cdot Kp/Kb$  (6)

$Y\_b = Nb + Np \cdot Xp/Xb \cdot Kb/Kp$  (7)

where Kp=1.0 and Kb=1.4

Note here that by dividing remain_bit_GOP by the coefficients Y_i, Y_p, and Y_b assigned to the I, P and B pictures, respectively, determined as above, it is possible to determine a code amount to be assigned to each picture. Also note that the initial value of each of Xi, Xp and Xb may be 1.39×bit rate, 0.52×bit rate and 0.37×bit rate, respectively.

Next, there will be explained operations to be done when the value of vbv_occupancy_f calculated based on the taken-over vbv_delay_n is extremely small.

If the value of vbv_occupancy_f calculated by the aforementioned equation (3) is extremely small, the image quality will considerably be degraded for the following reasons even if a transition of the value is made to vbv_occupancy_t on the basis of the equation (4).

If vbv_occupancy_f is extremely small because of the relation with an amount of generated code data of a next picture to be spliced, the amount of generated code data of the next picture will be limited for no underflow of the VBV buffer at the time of encoding and thus the image quality will be degraded. In such a case, if number_GOP is fixed at a given value, some first GOPs have extremely low vbv_occupancy until vbv_occupancy_t is reached. So, the image quality will considerably be degraded and a long time will be taken until an optimum vbv_occupancy_t is reached. Therefore, the image quality cannot be improved soon. Further, if the corrected amount of generated code data per GOP is increased to shorten the time for transition to vbv_occupancy_t, the image quality will considerably be degraded for a time until vbv_occupancy_t is reached.

On this account, the image data processor 1 according to the present invention is adapted to select image holding rather than a considerable degradation of image quality by inserting a copy picture when vbv_occupancy_f calculated by the equation (3) is smaller than a preset value in order to prevent the above image-quality degradation.

In case vbv_occupancy_f calculated based on vbv_delay_n is smaller than a set value as shown in FIG. 10A, copy pictures are continuously inserted as shown in FIG. 10B. Thus, the VBV delay (vbv_delay_n2) appears to be large because it corresponds to a time period from a time t41 to t42, and vbv_occupancy_f2 calculated based on the VBV delay will be larger than the set value. Thus, the screen will be held for a longer time, but the image quality can be prevented from being degraded.

Note that the number of inserted copy pictures (N) is determined, by calculation, so that vbv_occupancy_f2 obtained correspondingly to vbv_delay_n2 of a next picture is larger than the set value.

First, when N copy pictures are inserted, the time t42 at which a next picture is extracted will be delayed a time corresponding to the N copy pictures and thus vbv_delay_n2 will be longer by the N copy pictures. On the other hand, the next picture will be shifted backward by N times the transfer time FT for one copy picture, and thus vbv_delay_n2 will be shorter by a time corresponding to N times the transfer time FT.

On the assumption that the display time ET for one copy picture is ET, vbv_delay_n2 is given by the following equation (8):

$$vbv\_delay\_n2 = vbv\_delay\_n + N \times (ET - FT) \quad (8)$$

Note that the display time ET for a copy picture is 3003 when the frame frequency is 29.97 Hz, and 3600 when the frame frequency is 25 Hz.

The number (N) of copy pictures is determined, by calculation, so that vbv_delay_n2 is larger than a set value (vbv_delay_s) for vbv_delay calculated by the equation (3) from the set value of vbv_occupancy. That is, the following formula (9) can be derived from the aforementioned equation (8):

$$vbv\_delay\_n + N \times (ET - FT) \geq vbv\_delay\_s \quad (9)$$

The number (N) of copy pictures is given by the following formula (10) resulted from deformation of the formula (9):

$$N \geq (vbv\_delay\_s - vbv\_delay\_n)/(ET - FT) \quad (10)$$

In the image data processor 1 according to the present invention, vbv_delay_n2 can be obtained by inserting N copy pictures calculated as above, and converted into a data occupancy in the VBV buffer. The data occupancy thus obtained can be taken as an initial value for the encoder. Thus, even if vbv_occupancy_f calculated by the equation (3) is extremely small, vbv_occupancy can optimally be controlled without any considerable degradation of image quality.

Next, there will be explained operations to be done when splicing data streams of image data supplied from any other electronic device when the taken-over vbv_delay_n value is extremely small.

For splicing data streams supplied from the other electronic device, vbv_occupancy is controlled by inserting stuffing bytes in addition to copy pictures.

Figure 11:
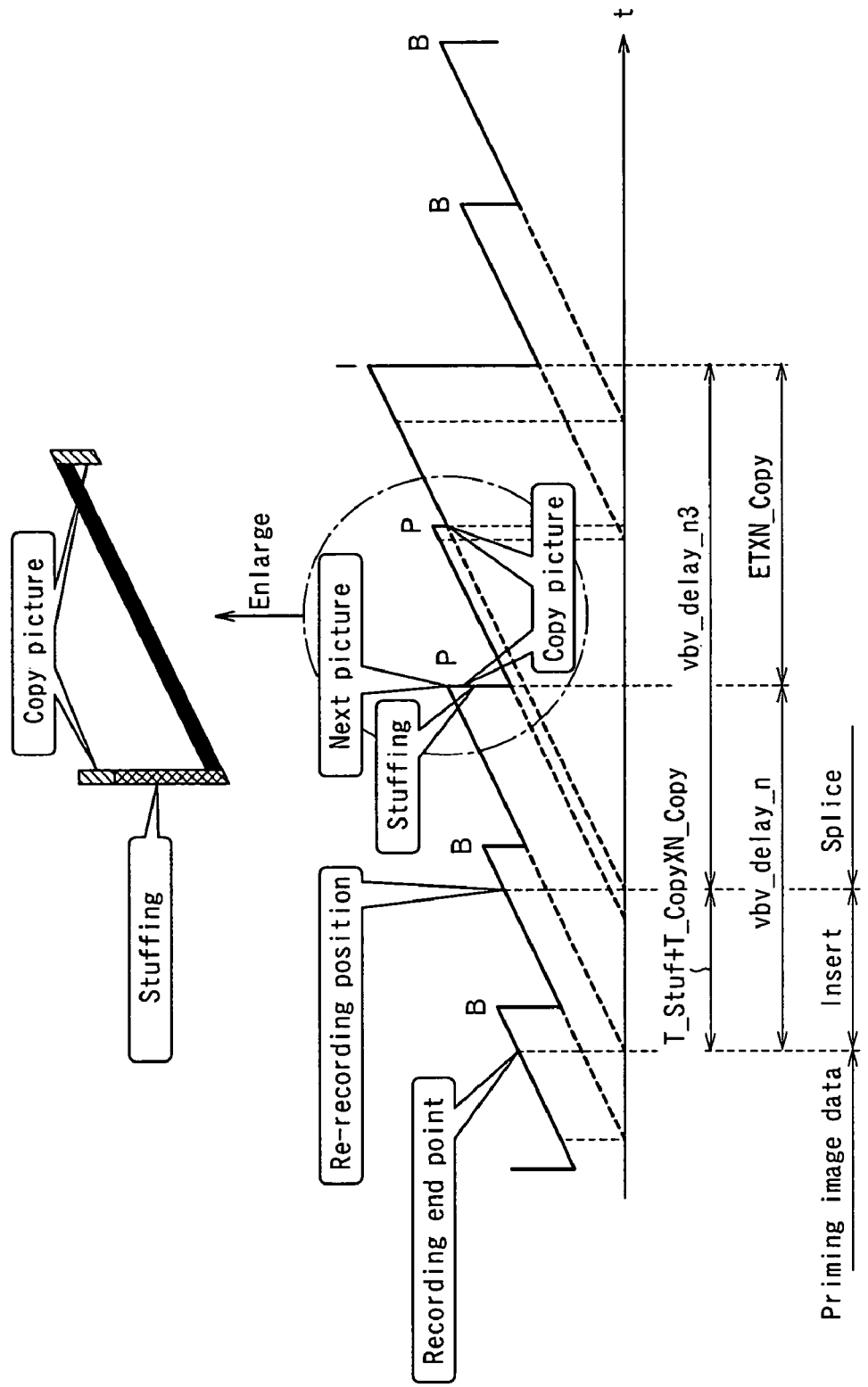
FIG. 11 explains an operation to be done when the vbv_delay_n value inherited when splicing data streams of image data supplied from another electronic device.

In case vbv_occupancy_f calculated based on vbv_delay_n is smaller than a set value, copy pictures and stuffing bytes are inserted for a period from a time t51 to t52 and stuffing bytes as shown in FIG. 11.

The number of copy pictures and that of stuffing bytes can be determined as will be described below:

First, vbv_delay_n is acquired from AUX-V of a next picture positioned just after a recording end point. Next, when image data to be spliced is supplied from the other electronic device, a VBV delay is acquired from the header of an I picture positioned at the top of the supplied image data and taken as vbv_delay_n3. Also, a bit rate represented in units of 400 bps is acquired from the header of the next picture.

At this time, on the assumption that the number of bytes of the copy picture is B_copy, T_copy resulted from conversion of the transfer time of the copy picture into units of 90 kHz can be given by the following equation (11):

$$T\_copy = B\_copy/bit\ rate \times Conversion\ factor \quad (11)$$

where the "conversion factor" is 1800 as given by the following equation (12) when the transfer time is converted in units of 90 kHz:

$$90000\ Hz \times 8\ bits/400\ bps = 1800 \quad (12)$$

The difference (VBVD_TN) of the VBV delay acquired as above can be defined as given by the following equation (13):

$$VBVD\_TN = vbv\_delay\_n3 - vbv\_delay\_n \quad (13)$$

Note here that when VBVD_TN $\leq 0$, the number of copy pictures (N_copy) is taken as 0 and only stuffing bytes are inserted. On the other hand, when VBVD_TN >0, the number (N_copy), given by the following equation (14), of copy pictures is inserted. It should also be noted that in the equation (14), N_copy is rounded out to an integer:

$$N\_copy = VBVD\_TN/(ET - T\_copy) \quad (14)$$

The rounded-out portion in the equation (14) is complemented with stuffing bytes (B_Stuf) given by the following equations (15) and (16):

$$T\_Stuf = (ET - T\_copy) \times N - VBVD\_TN \quad (15)$$

$$B\_Stuf = T\_Stuf \times Bit\ rate/1800 \quad (16)$$

More particularly, when supplied with data streams from the other electronic device, the image data processor 1 according to the present invention can insert copy pictures or stuffing bytes correspondingly to the acquired vbv_delay_n or vbv_delay_n3, respectively. Thus, copy pictures or stuffing bytes can be inserted whatever value vbv_delay_n has in relation to vbv_delay_n3, it is possible to control the data occupancy to a desired vbv_occupancy with little degradation of image quality.

Figure 12:
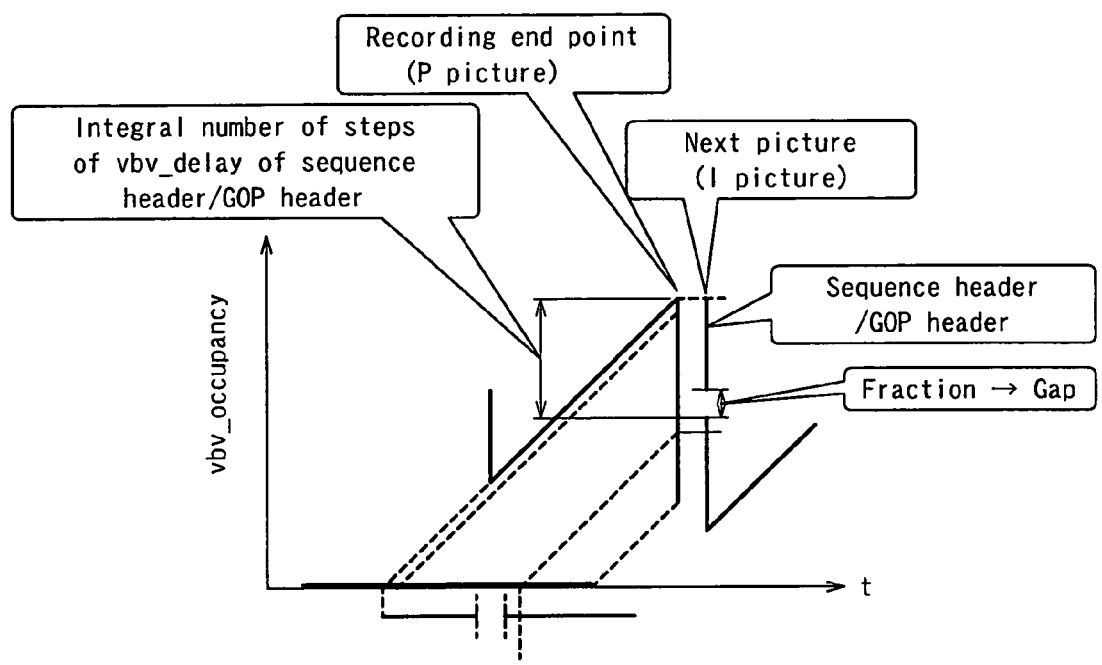
FIG. 12 explains the drawback of the splicing when a recording end point is followed by a P picture.

In case a picture just after the recording end point is a P picture and next pictures led by an I picture are spliced to this P picture, the bit rate will go up according to the data amount of the sequence header/GOP header as shown in FIG. 12. Therefore, it is necessary to subtract a VBV delay corresponding to the sequence header/GOP header as a value of correction from the determined vbv_delay_n.

Calculation of this correction value is made in an integral number of steps. If any fraction takes place in such a calculation, the fraction is rounded out, and then the bit rate is corrected according to the data amount of the sequence header/GOP header. The correction value thus calculated is used for calculation of the number of copy pictures and that of stuffing bytes at the time of taking over vbv_delay_n of a next picture.

Next, how to record the calculated number of copy pictures and that of stuffing bytes will be explained.

Figure 13:
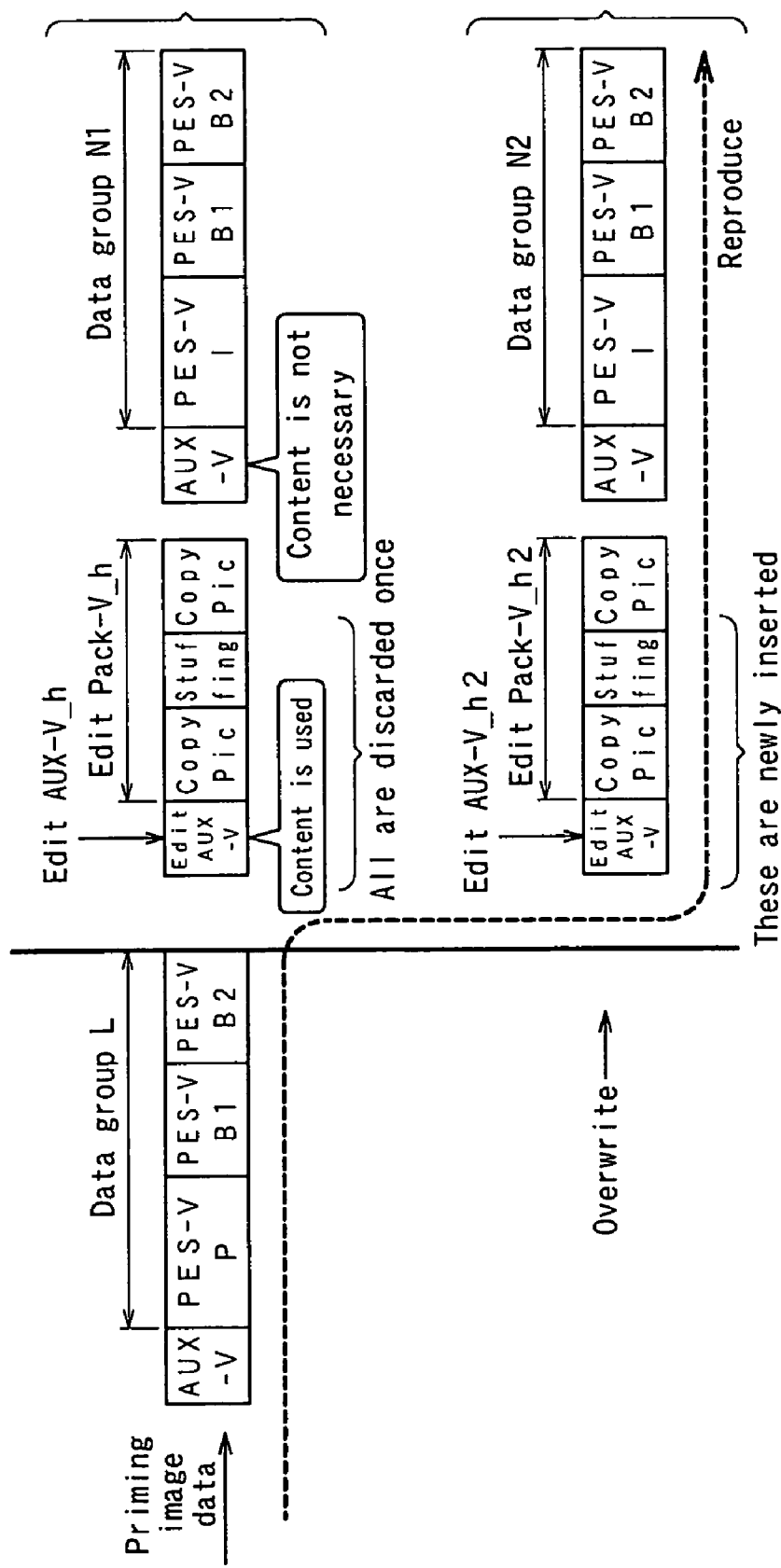
FIG. 13 explains how to record a calculated number of copy pictures and that of stuffing bytes.

On the magnetic tape 4, there are already recorded data groups each having AUX-V provided therein, led by an I or P picture and including a B picture as shown in FIG. 13. It should be noted that in FIG. 13, a data group L finally supplied to the image data processor 1 is shown as an example of priming image data.

In the re-recording position after the recording end point of the data group L, there will be recorded a data group N1 including a next picture going to be subjected to a first splicing. This data group N1 has also provided therein AUX-V for recording auxiliary data.

Further, between the data groups L and N1, there is provided an insertion auxiliary recording area (EditAUX_V_h) in which there will be recorded an insertion data group (EditPack_V_h) including a copy picture and/or stuffing byte. The insertion data group EditPack_V_h is provided correspondingly to the bit occupancy of the VBV buffer.

The insertion data group EditPack_V_h including the copy picture and stuffing byte is recorded as a data group independent of the data groups L and N1. Thus, only the insertion data group EditPack_V_h can be separated depending upon the situation. A value corresponding to the VBV delay of the stuffing byte is recorded in the insertion auxiliary recording area EditAUX_V_h. At this time, vbv_delay_n recorded in AUX-V of the data group N1 may be taken over and recorded to EditAUX_V_h.

For re-recording another image data in a re-recording position on a recording medium where the first splicing has been done, namely, for making a second splicing, the insertion data group EditPack_V_h is separated for removal. Then, a second data group N2 to be spliced is recorded as shown in FIG. 13. This data group N1 has also provided therein AUX_V in which auxiliary data is to be recorded. Further, between the data groups L and N2, there is provided an insertion auxiliary recording area (EditAUX_V_h2) where an insertion data group (EditPack_V_h2) including a copy picture and/or stuffing byte is recorded.

Figure 14:
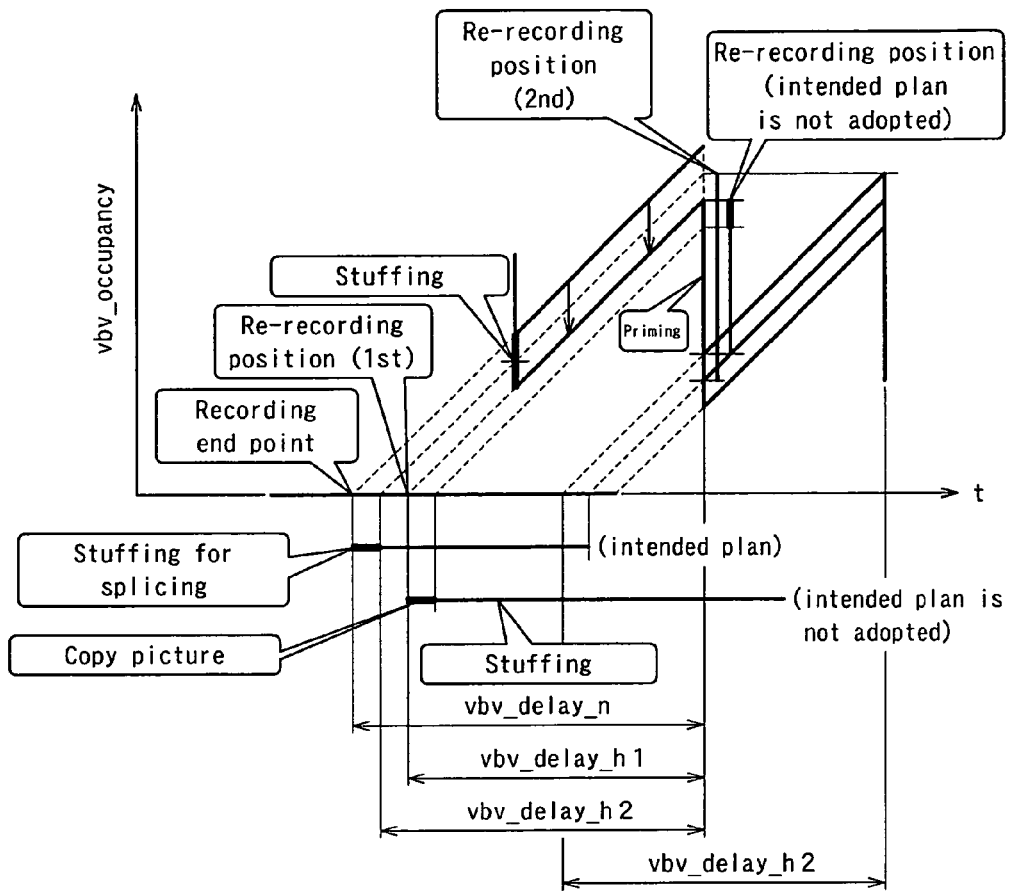
FIG. 14 shows a relation of time vs. data occupancy in a VBV buffer for second splicing taking, as a re-recording start point, the top of a data group N1 having undergone a first splicing.

By removing, in the second splicing, the insertion auxiliary data group EditPack_V_h having been recorded in the first splicing, the effect can be assured as will be described below:

FIG. 14 shows a relation of time vs. data occupancy in the VBV buffer for the second splicing taking, as a re-recording start point, the top of a data group N1 having undergone the first splicing. As shown in FIG. 14, the VBV delay (vbv_delay_h2) of the data group N2 is larger than the VBV delay (vbv_delay_h1) of the data group N1, and smaller the VBV delay (vbv_delay_n) of the data group L. Therefore, although it will suffice to determine the number of copy pictures and that of stuffing bytes, to be inserted, by making a comparison between vbv_delay_h2 and vbv_delay_n, an unnecessary stuffing byte or the like has already been recorded via the insertion data group (EditPack_V_h) because of the relation between vbv_delay_n and vbv_delay_h1 in the first splicing.

In the image data processor 1 according to the present invention, EditPack_V_h including the stuffing byte or the like for the first splicing has been removed before the data group N2 is supplied. Therefore, a number of stuffing bytes to be inserted can be determined by making a comparison between vbv_delay_h2 and vbv_delay_n with disregarding vbv_delay_h1. Also, no unnecessary stuffing byte or the like will be recorded and any useless screen hold can be prevented.

On the other hand, also in case a copy picture and stuffing byte are inserted because vbv_delay_h1 is larger than vbv_delay_n, EditPack_V_h has been removed before the data group N2 is supplied. Therefore, the number of copy pictures and that of stuffing bytes can be determined by making a comparison between vbv_delay_h2 and vbv_delay_n with disregarding vbv_delay_h1. Also, no unnecessary copy picture and stuffing byte or the like will be recorded and thus any useless screen hold can be prevented.

Figure 15:
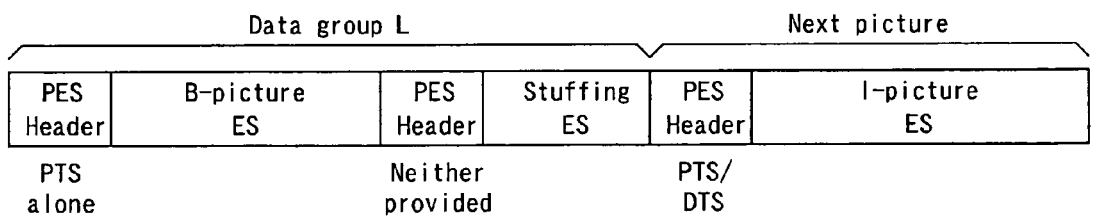
FIG. 15 explains addition of a PES header to only ES included in the stuffing byte.

Note that in case EditPack_V_h1 is composed of only a stuffing byte, a PES header is added to only ES included in the stuffing byte as shown in FIG. 15.

Thus, it becomes unnecessary to form an PES packet by combining ES forming only a stuffing byte with an other ES and thus the boundary of the stuffing will be defined. Thus, it is possible at the time of decoding to easily remove a stuffing byte to which the PES header has been added.

Figure 16:
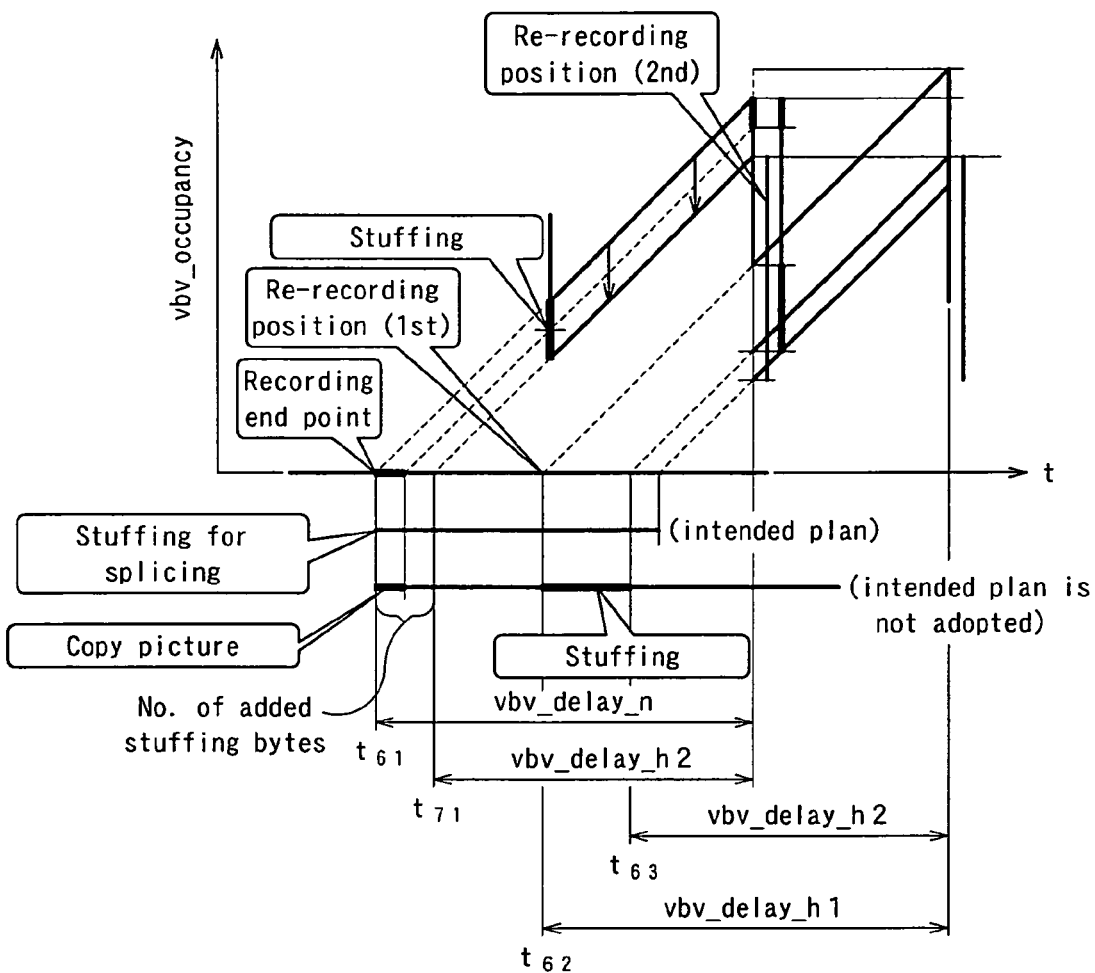
FIG. 16 explains the re-recording start point for the second splicing.

Next, there will be explained the re-recording position in the second splicing:

FIG. 16 shows vbv_delay_h1 starting at a time t62 with a copy picture and stuffing byte being inserted in relation to vbv_delay_n starting at a time t61. At this time, the second splicing is effected and vbv_delay_h2 having an additional stuffing byte added thereto will start at a time t63 delayed by the additional stuffing byte from the time t62.

At this time, even if an accurate additional number of stuffing bytes is determined by making a comparison between vbv_delay_h2 and vbv_delay_n, a useless screen hold for the stuffing byte or the like in EditPack_V_h having been removed in the second splicing will take place when the recording start position is the time t63. Therefore, according to the present invention, the recording start position in the second splicing is controlled to be a time t71 which is delayed by the additional number of stuffing bytes from the time t61 when vbv_delay_n starts.

That is, EditPack_V_h having recorded therein the number of stuffing bytes which is for the first splicing is removed once, a new additional number of stuffing bytes is determined by making a comparison between vbv_delay_h2 and vbv_delay_n, and the number of stuffing bytes thus determined is inserted before the next picture. Thus, it is possible to reduce useless screen hold.

Note that EditAUX_V_h may have recorded therein a copy picture identification flag and a flat for identification of the number of copy pictures.

Figure 17:
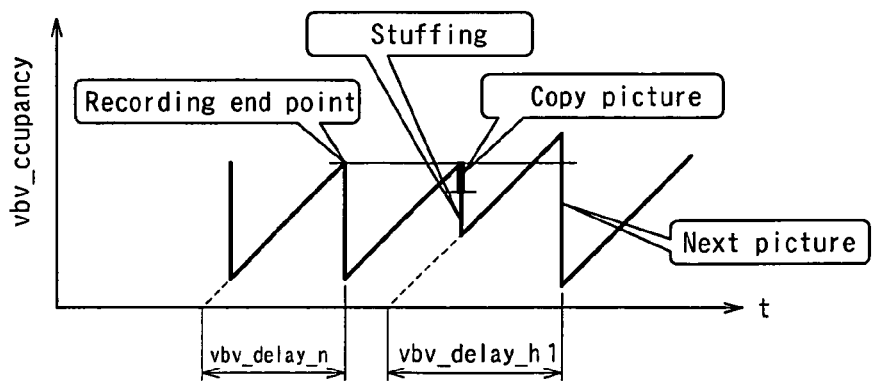
FIG. 17 explains recording, to a magnetic tape, of both the copy picture and stuffing byte.

Also note that in case both a copy picture and stuffing byte are to be recorded to the magnetic tape 4, the copy picture is first recorded, and then a stuffing byte is recorded after the copy picture, as shown in FIG. 17. Thus, it is possible to prevent any underflow.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

INDUSTRIAL APPLICABILITY

As having been described in the foregoing, the image data processing apparatus and method according to the present invention control the number of bits for assignment to each GOP of to-be-coded image data to make a transition of the bit occupancy in a VBV buffer to a target value calculating the initial value of a bit occupancy in the VBV buffer on the basis of auxiliary data read from a recording medium, making a comparison between the target and initial values of the bit occupancy, and controlling the number of bits for assignment to each GOP correspondingly to the result of comparison.

Thus, the image data processing apparatus and method according to the present invention can control the data occupancy in a VBV buffer without degradation of the image quality because it is possible to insert a copy picture and also a stuffing byte whatever value the auxiliary data read from a recording medium takes. Also, since the amount of generated code data can gradually be corrected by multiplying a target value of the bit occupancy by a plurality of GOPs (number_GOP), it is possible to reduce the amount of correction per GOP and thus prevent temporary image quality degradation.

The invention claimed is:

1. An image data processor for controlling the number of bits for assignment to each GOP (group of pictures) of to-be-coded image data for transition of the bit occupancy in a VBV (video buffering verifier) buffer, used in decoding with the MPEG technique, to a target value, the apparatus comprising:
   a calculating means for calculating the initial value of a bit occupancy in the VBV buffer on the basis of auxiliary data read from a recording medium;
   a comparing means for making a comparison between the target and initial values of the bit occupancy; and a controlling means for controlling the number of bits for assignment to each GOP correspondingly to the result of comparison.

2. The apparatus according to claim 1, wherein:
the comparing means determines a difference between the target and initial values of the bit occupancy; and
the controlling means controls the number of bits for assignment to each GOP on the basis of a value resulted from division of the difference determined by the comparing means by the number of GOPs.

3. The apparatus according to claim 1, wherein the controlling means further assigns the number of bits assigned to each GOP to each of pictures included in the GOP correspondingly to the type of a picture.

4. The apparatus according to claim 1, wherein the calculating means reads, from the recording medium, a next VBV delay (VBV_delay_N) to be inserted as the auxiliary data.

5. The apparatus according to claim 1, wherein in case the initial value of the bit occupancy is smaller than the target one, the controlling means inserts at least one copy picture repeatedly representing a previous picture to before an I picture.

6. The apparatus according to claim 5, wherein in case the initial value of the bit occupancy is smaller than a set value R, the controlling means determines an initial value VBV_delay_S of a video encoder correspondingly to a VBV_delay_N, number (N) of copy pictures to be inserted, display time (ET) for the copy picture and a transfer time (FT) of the copy picture.

7. The apparatus according to claim 6, wherein the initial value VBV_delay_S is calculated based on the following formula:

$$VBV\_delay\_S = VBV\_delay\_N + N \times (ET-FT).$$

8. The apparatus according to claim 5, wherein the number (N) of copy pictures to be inserted is as given by the following formula:

$$N \geq (\text{Set value } R - VBV\_delay\_N)/(ET-FT).$$

9. The apparatus according to claim 4, wherein:
the comparing means reads a VBV delay (VBV_delay_I) of an I picture at the top of externally entered image data; and
the controlling means inserts at least one copy picture to before the I picture correspondingly to a difference between the VBV_delay_N and VBV_delay_I or inserts a stuffing byte.

10. The apparatus according to claim 9, wherein in case the difference between the VBV_delay_N and VBV_delay_I is 0 or less, the controlling means inserts only the stuffing byte without insertion of any copy picture.

11. The apparatus according to claim 9, wherein in case the difference between the VBV delay _N and VBV_delay_I is larger than 0, the controlling means inserts at least one copy picture and a stuffing byte.

12. The apparatus according to claim 4, wherein in case the last picture recorded in the recording medium is a P picture, the controlling means corrects the VBV_delay_N correspondingly to the size of a sequence header and that of a GOP header.

13. An image data processing method of controlling the number of bits for assignment to each GOP (group of pictures) of to-be-coded image data for transition of the bit occupancy in a VBV (video buffering verifier) buffer, used in decoding with the MPEG (Moving Picture Experts Group) technique, to a target value, the method comprising the steps of:
calculating, using an image data processor, the initial value of a bit occupancy in the VBV buffer on the basis of auxiliary data read from a recording medium;
making a comparison between the target and initial values of the bit occupancy; and
controlling the number of bits for assignment to each GOP correspondingly to the result of comparison.

14. The method according to claim 13, wherein:
a difference between the target and initial values of the bit occupancy is determined; and
the number of bits for assignment to each GOP is controlled on the basis of a value resulted from division of the difference determined by the comparing means by the number of GOPs.

15. The method according to claim 13, wherein the number of bits assigned to each GOP is further assigned to each of pictures included in the GOP correspondingly to the type of a picture.

16. The method according to claim 13, wherein a next VBV delay (VBV_delay_N) to be inserted is read as the auxiliary data from the recording medium.

17. The method according to claim 13, wherein in case the initial value of the bit occupancy is smaller than the target one, at least one copy picture repeatedly representing a previous picture is inserted to before an I picture.

18. The method according to claim 17, wherein in case the initial value of the bit occupancy is smaller than a set value R, an initial value VBV_delay_S of a video encoder is determined correspondingly to a VBV_delay_N, number (N) of copy pictures to be inserted, display time (ET) for the copy picture and a transfer time (FT) of the copy picture.

19. The method according to claim 18, wherein the initial value VBV_delay_S is calculated based on the following formula:

$$VBV\_delay\_S = VBV\_delay\_N + N \times (ET-FT).$$

20. The method according to claim 17, wherein the number (N) of copy pictures to be inserted is as given by the following formula:

$$N \geq (\text{Set value } R - VBV\_delay\_N)/(ET-FT).$$

21. The method according to claim 16, wherein:
a VBV delay (VBV_delay I) of an I picture at the top of externally entered image data is read; and
at least one copy picture is inserted to before the I picture correspondingly to a difference between the VBV_delay_N and VBV_delay_I or inserts a stuffing byte.

22. The method according to claim 21, wherein in case the difference between the VBV_delay_N and VBV_delay_I is 0 or less, only the stuffing byte is inserted without insertion of any copy picture.

23. The method according to claim 21, wherein in case the difference between the VBV_delay_N and VBV_delayI is larger than 0, at least one copy picture and a stuffing byte are inserted.

24. The method according to claim 16, wherein in case the last picture recorded in the recording medium is a P picture, the VBV_delay_N is corrected correspondingly to the size of a sequence header and that of a GOP header.

* * * * *